United States
Sloane et al.

[11] 3,710,082
[45] Jan. 9, 1973

[54] SYSTEM FOR DIGITALLY CONTROLLING A VIBRATION TESTING ENVIRONMENT OR APPARATUS

[75] Inventors: Edwin A. Sloane; Charles L. Heizman, both of Los Altos, Calif.

[73] Assignee: Time/Data Corporation, Palo Alto, Calif.

[22] Filed: July 22, 1971

[21] Appl. No.: 165,176

Related U.S. Application Data

[63] Continuation-in-part of Ser. No. 23,556, March 3, 1970, abandoned.

[52] U.S. Cl. .................... 235/151, 73/71.6, 340/261
[51] Int. Cl. ........................ G01n 29/00, G06f 15/34
[58] Field of Search......235/150.5, 150.53, 151, 156, 235/181; 73/67.2, 70, 71.5, 71.6; 340/261

[56] References Cited

UNITED STATES PATENTS

| | | |
|---|---|---|
| 3,100,393 | 8/1963 | Bell ........................................73/71.6 |
| 3,157,045 | 11/1964 | Maki .....................................73/71.6 |
| 3,345,864 | 10/1967 | Painter et al. .........................73/71.6 |
| 3,431,405 | 3/1969 | Dawson..............................235/150.5 |
| 3,529,142 | 9/1970 | Robertson ....................235/150.53 X |

Primary Examiner—Eugene G. Botz
Assistant Examiner—Jerry Smith
Attorney—Spensley, Horn & Lubitz

[57] ABSTRACT

A system for controlling a vibration testing environment or apparatus such as a shaker table with a random signal in order to subject a specimen on the table to vibrations having a predetermined power spectral density is disclosed. The movement of the specimen is sensed and converted into a digital signal representative of the power spectral density of the movement. This digital signal is compared with the predetermined or desired spectral density and the results of the comparison are utilized with a digitally generated random phase angle to produce a random digital signal. This random digital signal is converted to a time-domain, analog driving signal for driving the apparatus. The same system may be used for high intensity sound testing and sine wave testing.

30 Claims, 7 Drawing Figures

EDWIN A. SLOANE
CHARLES L. HEIZMAN
INVENTORS

BY
*Spensley & Horn*
ATTORNEYS

SYSTEM FOR DIGITALLY CONTROLLING A VIBRATION TESTING ENVIRONMENT OR APPARATUS

This is a continuation-in-part of application, Ser. No. 23,556, filed Mar. 3, 1970 and now abandoned.

BACKGROUND OF THE INVENTION

1. Field of the Invention

The invention relates to systems for controlling vibrations.

2. Prior Art

The vibrations caused by many natural phenomena and man-made systems are random in nature and are not restricted to specific frequencies. These vibrations are often defined in terms of statistical quantities such as the acceleration spectral density or power spectral density. The term "white noise" is often used when referring to a signal or vibration where the spectral density is flat with respect to frequency.

In order to adequately test many devices prior to their actual use, particularly in aerospace applications, it is necessary that the devices be subjected to random vibrations that are representative of those that are to be experienced in actual usage. Because the actual vibrations experienced is the sum of a number of independent vibrational sources, the amplitude probability distribution tends to be gaussian. Further, each excitation source tends to produce vibrational energy at the test specimen with a peculiar spectral content. Therefore, the vibration test should simulate the net effect of all excitation sources by ensuring gaussian amplitude characteristics and appropriately shaped spectrum. Hence, the random signal source used in the vibration control system must be capable of having its spectral content controlled so that the vibrations actually experienced at the test specimen are representative of the environment even after modification of the excitation by the shaker and associated equipment.

Numerous prior art systems have been designed for controlling the movement of vibration apparatus or shaker table in order to induce random vibrations or vibrations having a predetermined spectral density. For example, see U.S. Pat. Not. 3,157,045 or ISA Transactions, October, 1966, "The speed of Response of an Automatic Random Equalizer." These systems sense the movement of an apparatus or table and pass a signal representative of this movement through a plurality of band-pass filters, each filter passing a predetermined band of frequencies. The amplitude of the vibrations for each of the frequency bands is utilized to control the content for that particular frequency band of a random-noise signal which drives the apparatus or table. These systems which utilize basically analog signals, have numerous disadvantages many of which are described in An Automatic, Adaptive, Servo Control for Stochastic Processes By D. F. Hillyer, Jr.; The Journal of Environmental Sciences, February 1966.

SUMMARY OF THE INVENTION

A system for driving or controlling a vibration testing environment or apparatus such as a shaker table with a random signal in order to subject a specimen in the environment or on the apparatus to vibrations having a predetermined power spectral density is described. The movement or accelerations to which the specimen in the environment or on the apparatus is subjected is sensed by accelerometers and is converted into a digital signal. A power spectral density analysis is performed on the digital signal by first performing a Fourier Transform on the signal. This power spectral density is compared with a desired or predetermined power spectral density and the results of the comparison are utilized to generate a random signal which when converted to a time domain signal, drives or controls the vibrations of the environment or apparatus. A generator for generating random digital signals representative of a phase angle, generates the random parameter of the random driving signal. This phase angle is utilized with the results of the comparison between the actual and desired spectral densities to form a random digital signal. This signal is converted to a time domain function by performing an inverse Fourier Transform on the random digital signal. The results of the inverse Fourier Transform are converted to an analog signal which is utilized to drive or control the environment or apparatus. The comparison and the performance of the Fourier and inverse Fourier Transforms may be performed on a general purpose digital computer or a specialized digital computer may be utilized for the Fourier and inverse Fourier Transform calculations.

It is an object of the present invention to provide a system for digitally controlling a vibration testing environment or apparatus by utilizing a precision analysis of the vibrations to which a specimen is in said environment or on said apparatus subjected.

It is still a further object of the present invention to provide a vibration controlling system which has stable operation and where fine tuning adjustments are not required.

It is a still further object of the present invention to provide a system for controlling vibrations where selectable frequency resolution and bandwidth have no lower limit.

Another object of the present invention is to provide a system for controlling a vibration testing apparatus or environment in which tests performed by the system are repeatable.

It is still another object of the present invention to provide a system having the versatility to perform a wide variety of vibration testing, including random tests and sine wave testing.

A further object of the present invention is to provide a system for controlling a vibration testing environment or apparatus in accordance with a predetermined frequency spectrum and wherein said predetermined frequency spectrum may be varied during testing to simulate a time varying environment.

DETAILED DESCRIPTION OF THE INVENTION

A system and method for controlling a vibration testing environment or apparatus such as a shaker table is described. The system allows a specimen in the environment or on the apparatus to be subjected to vibrations having a predetermined power spectral density (PSD) or auto-spectral density. While in the specification, the system is described with reference to an apparatus such as a shaker table, it will be obvious that the system may be used to control a vibration environment such as is used for high intensity sound testing and other acoustical testing. For purposes of the specification, the words "shaker table" or "shaker system" shall mean any one of numerous vibration testing apparatuses or systems commonly known and used for subjecting countless types of equipment and devices (hereinafter referred to as "specimens") to acceleration forces or vibrations. Throughout the specification reference will be made to the term "random signal," included within the meaning of this term unless otherwise indicated is a pseudo random signal.

Figure 2:
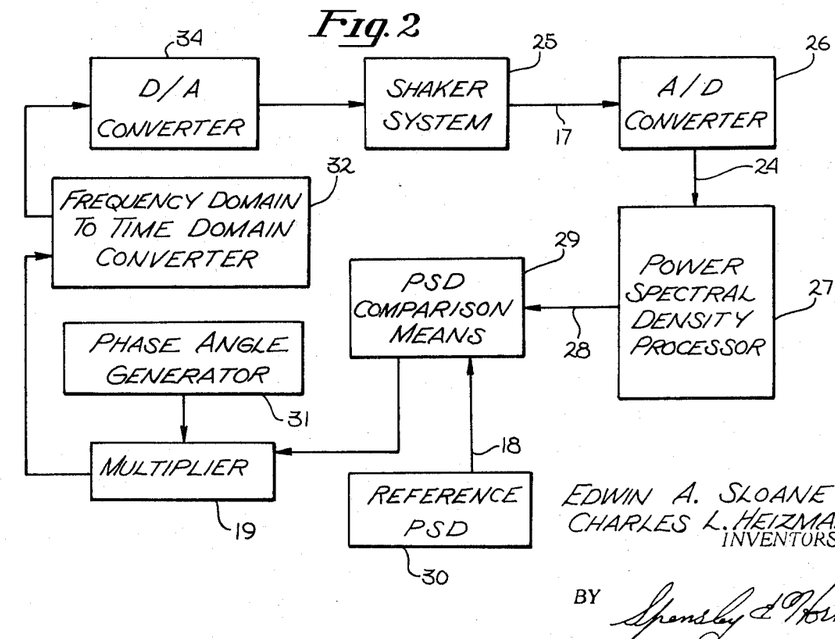
FIG. 2 is a functional block diagram of the system of FIG. 1.

Referring to FIG. 2, the general method in which the system operates may be readily understood. Shaker system 25 includes the shaker table or other vibration apparatus and means for sensing the movement or acceleration of a specimen engaging the shaker table and for producing an output analog signal representative of this movement or acceleration. The output of the shaker system 25 is coupled to the analog-to-digital converter 26 on lead 17, where the signal is converted to digital form with the A/D converter 26. This digital signal is communicated to the power spectral density processor 27 on lead 24.

The power spectral density (PSD) or, as it is sometimes called, the auto-spectral density, for the signal communicated to processor 27 on lead 24 is computed in processor 27. Any one of numerous methods may be used to determine the PSD. One convenient method which is utilized by the presently preferred embodiment of the invention is to determine the Fourier co-efficients of the signals as defined by the following equation:

$$G(f) = \int_{-\infty}^{+\infty} g(t)(\cos 2\pi ft - j \sin \pi ft) dt \qquad (1)$$

where $g(t)$ is a time-domain function representative of the movement of the specimen on the shaker table. Since the movement of the specimen will typically be sampled for a finite period of time T, the transform may be written as follows:

$$G_T(f) = \int_{-T/2}^{+T/2} g(t)[\cos 2\pi ft - j \sin 2\pi ft] dt = P_T(f) - j Q_T(f) \qquad (2)$$

where:

$$P_T(r) = \int_{-T/2}^{+T/2} g(t) \cos 2\pi ft \, dt \qquad (3)$$

and $$Q_T(f) = \int_{-T/2}^{+T/2} g(t) \sin 2\pi ft \, dt \qquad (4)$$

$P_T$ is equal to the real co-efficients and $Q_T$ is equal to the imaginary co-efficients of the Fourier transform. The power spectral density $S(f)$ may be determined by summing the squares of the imaginary and real co-efficients of the Fourier transform as illustrated by the following equation:

$$S(f) = 1/T [|P(f)|^2 + |Q(f)|^2] \qquad (5)$$

Figures 3, 4:
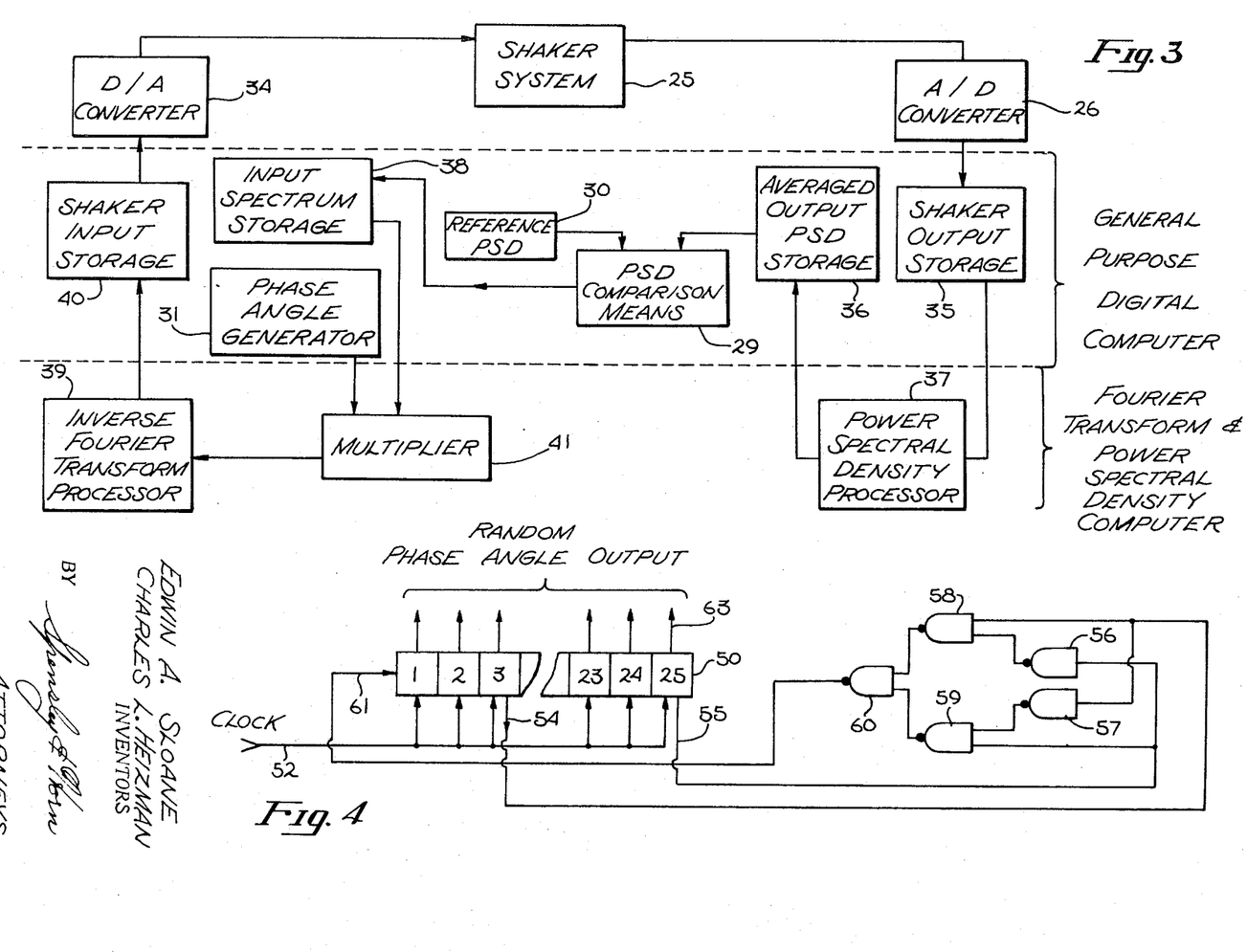
FIG. 3 is a detailed functional block diagram for the system illustrated in FIG. 1.
FIG. 4 is a schematic of a circuit for generating a pseudo random signal which is used as a phase angle in the generation of a random spectrum.

The output from processor 27 which is the PSD to which the specimen is subjected is communicated to PSD comparison means 29 on lead 28. In comparison means 29, the actual PSD to which the specimen is being subjected is compared to a predetermined or desired PSD. It is of course, the object of the present invention to subject the specimen to the predetermined and desired PSD. In FIG. 2, the desired PSD is illustrated as reference PSD 30 and is coupled to PSD comparison means 29 by lead 18. Any one of numerous techniques may be utilized to compare the actual PSD with the predetermined PSD. A straight forward although somewhat time-consuming technique (because of the square root computation) for comparing the two PSD's is to utilize the following equation (It is assumed for this equation that the movement of the specimen on the shaker table is sensed for intervals referred to as frames as will be more fully discussed in conjunction with FIGS. 5 and 6):

$$I_k(f) = I_{k-1}(f)[R(f)/S_{k-1}(f)]^{1/2} \qquad (6)$$

where $R(f)$ is the amplitude of the predetermined PSD and $S_{k-1}(f)$ is the average amplitudes of the actual PSD after frame $k-1$. $I_K(f)$ are the amplitudes that result from the comparison. Note that in this comparison, it is assumed that the averages of some predetermined number of PSD frames is utilized. This will be more fully discussed in conjunction with FIG. 3. Another approach to the comparison is to use the following equation:

$$I_k(f) = I_{k-1}(f) [1 - \beta S_{k-1}(f) - R(f)] \qquad (7)$$

In this equation, $\beta$ is an adjustable parameter that is utilized as a loop-gain control.

The results of the comparison which is a spectrum of amplitudes are utilized to generate a random spectrum signal. Basically, the amplitudes which result from the comparison are combined with a random signal such as a randomly generated phase angle to produce a random system signal. The generation of the random phase angle is illustrated in FIG. 2 by generator 31. The sine and cosine of the angles from the phase angle generator together with the amplitudes that result from the comparison are multiplied as indicated by multiplier 19 and the products are converted into a time-domain function as illustrated by the frequency domain to time-domain converter 32 of FIG. 2.

One method of converting the amplitudes and phase angle from a spectral domain into a time-domain signal is to utilize the commonly known inverse Fourier transform. In FIG. 2, converter 32 may be a means adaptable for applying an inverse Fourier transform to the outputs of multiplier 19. A randomly generated phase angle is associated with each amplitude from means 29 by multiplying each amplitude by $e^{j\theta}$ where $\theta$ is the random phase angle generated by generator 31. In practice, the actual PSD is computed for a finite number of frequencies and the comparison of amplitudes between the actual and predetermined PSD's is made at these predetermined frequencies. The predetermined frequency associated with each amplitude, along with the randomly generated phase angle for that frequency and amplitude are used in the inverse Fourier transform.

In the presently preferred embodiment, a Fourier transform is used as one step in the conversion of a signal representative of the movement of a specimen on the shaker table to a signal representative of the PSD of this movement. It should be noted that the Fourier transform is not a necessary step and that other computations may be utilized to obtain the PSD. Also, in the presently preferred embodiment, the power spectral density or auto-spectral density is used to statistically describe the movement of the specimen in the frequency domain. Other frequency domain transforms or representations may be utilized other than the power spectral density within the scope of the present invention.

One advantage to the present invention which is readily apparent is that the predetermined or desired PSD may be varied during the operation of the system. This is particularly beneficial when it is desirous to subject a specimen to excitation that simulates a time varying vibration environment.

Figure 1:
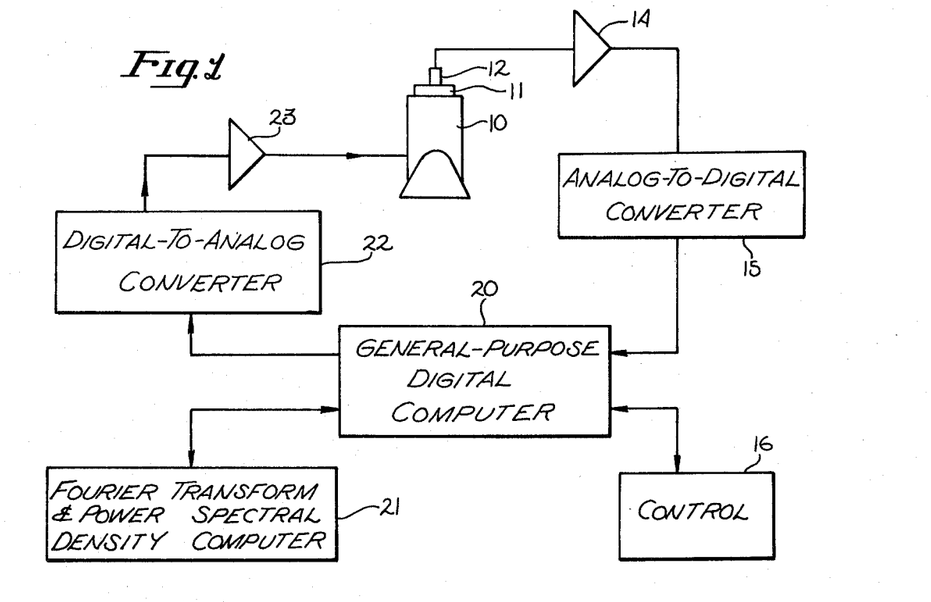
FIG. 1 is a block diagram of the system for digitally controlling a vibration testing apparatus or shaker table.

A system for subjecting a specimen 11 on a shaker table 10 to a predetermined PSD is illustrated in FIG. 1. An accelerometer 12 is rigidly mounted to specimen 11 so that it is subjected to the same movement as the specimen 11. The signal generated by the accelerometer 12 is coupled to an amplifier 14 to an analog-to-digital converter 15. Converter 15 converts the signal generated by accelerometer 12 into digital form. Accelerometer 12, amplifier 14, and converter 15 may be ordinary electrical or electromechanical components commonly known in the art. The digital output from converter 15 is applied to general purpose digital computer 20. The general purpose digital computer may be any one of numerous commercially available digital computers. A control 16 is illustrated coupled to the computer 20; control 16 may be utilized to change the predetermined PSD which is stored in computer 20 and to observe the functioning of the system. For example, control 16 may have a CRT display so that the actual PSD to which the specimen 11 is subjected may be observed. A Fourier transform and spectral density computer 21 is coupled to computer 20. The output of computer 20 is coupled to a digital-to-analog converter 22. The function of converter is to convert the output digital signal from computer 20 into an analog form. The signal is applied to shaker table 10 through amplifier 23, and is utilized as the driving signal to drive shaker table 10. Converter 22 and amplifier 23 may be ordinary electrical components commonly known in the art.

The functions previously discussed in conjunction with FIG. 2 are performed by the various components illustrated in FIG. 1. The shaker system 25 of FIG. 2 comprises the shaker table 10, accelerometer 12, and amplifiers 14 and 23 of FIG. 1. The function of A/D converter 26 of FIG. 2 is performed by converter 15 of FIG. 1. The power spectral density processor 27 and the frequency domain to time-domain converter 32 of FIG. 2 are represented in FIG. 1 by the Fourier transform and power spectral density computer 21. The PSD comparison function, the random phase angle generation, the multiplication performed by multiplier 19 and the storage of the reference PSD are performed by the general digital computer 20 of FIG. 1. The D/A converter 34 of FIG. 2 is illustrated as converter 22 of FIG. 1.

While in FIG. 1, the Fourier and inverse Fourier transforms and the power spectral density comparison are illustrated as being performed by computer 21, a computer separate and apart from computer 20, it is within the scope of the present invention to do all the computation within a single general purpose digital computer, utilizing commonly known techniques and programs. For example, the Fourier and inverse Fourier transforms may be computed in the general purpose digital computer utilizing the techniques developed by J. W. Cooley and J. W. Tukey, "Algorithm for the Machine Calculation for Complex Fourier Series," Math of Computation, Vol 19, Pages 297–301, April, 1965. Other techniques for computing the Fourier transforms can be found in an article by G. C Danielson and Cornelius Lanczos, Franklin Institute Journal, Vol. 233, April, 1942 and in IEEE Spectrum, July, 1969, Page 41. In addition to performing the comparison functions and calculating the PSD, the computer 20 may also be used as a control means to control such functions as the rate at which the converter 15 samples and converts the signals representative of a movement of specimen 11 and the general timing and flow of the signals in the system illustrated in FIG. 1.

In the preferred embodiment of the present invention, the PSD comparison means 29 of FIG. 2, the generation of the random spectrum (generator 31 of FIG. 2) and the general control function of the system are performed by the digital computer 20. A specialized computer particularly adaptable for performing Fourier transforms and spectral density computations is used to perform these computations. One computer for performing the Fourier transform which is also adaptable for performing the inverse Fourier transform and power spectral density computations is disclosed in copending application, Ser. No. 771,031, filed Oct. 28, 2968 and now U.S. Pat No. 3,638,004.

The functioning of the system illustrated in FIG. 1 may be readily understood in conjunction with the functional diagram of FIG. 2. Signals representative of the movement of the specimen 11 are generated by accelerometer 12 and communicated to analog-to-digital converter 15. In the converter these signals are converted into digital form and communicated to computer 20. This signal flows from computer 20 into computer 21 where first the Fourier transform is computed and then from the Fourier coefficients the power spectral density is determined. The power spectral density is then returned to the general purpose digital computer 20 where it is compared with the predetermined spectral density which has previously been stored within computer 20. Computer 20 also generates the random phase angles which are utilized with the results of the comparison to form a random digital signal representative of a frequency spectrum. This signal is again communicated to computer 21 where the inverse Fourier transform of the signal is computed. The results of the transform are applied to converter 22 via computer 20 where the signal is converted into an analog signal which is utilized to drive shaker table 10.

Referring to FIG. 3, the functions illustrated in FIG. 2 are again illustrated in FIG. 3 in more detail. Those functions which are performed by the general purpose digital computer 20 of FIG. 1 are so indicated by the bracket shown in that figure. Those functions which are performed by the Fourier transform and spectral density computer 21 of FIG. 1 are also illustrated in FIG. 3. The shaker system 25, A/D converter 26 and D/A converter 34 of FIG. 2 are again illustrated in FIG. 3. The information converted into digital form by converter 26 is communicated to shaker output storage 35 which is part of the general purpose digital computer. Typically, the output data from the converter is stored within the computer until it is communicated to the means which computes the PSD. The PSD is illustrated being computed within processor 37 which is part of computer 21 of FIG. 1. The PSD is then returned to computer 20 (FIG. 1) to a functional block illustrated as the averaged output PSD storage 36. It has been found that the system of FIG. 1 operates more effectively if an average PSD is utilized for the comparison. For example, the PSD which is utilized for the comparison may be the average of a plurality of PSD's previously received from processor 37. Each time a new PSD is received, the oldest PSD utilized for the average is disregarded and the newest accepted for determining the average PSD. The average PSD is communicated to PSD comparison means 29 which is also illustrated in FIG. 2. Other averaging techniques may be used such as a uniform and non-uniform weighted moving average utilizing an exponentially weighted average. Within means 29, the average PSD is compared with the predetermined reference PSD 30. As will be noted, the equations previously set forth for comparing the predetermined and actual PSD's utilize an average PSD which is the output from PSD storage 36. Also as has been previously noted, the reference PSD 30 may be changed during the operation of the system so as to simulate a time varying vibration environment.

The results of the comparison are stored in input spectrum storage 38, a function performed by computer 20 of FIG. 1. The phase angle generator 31 generates the random digital signals which are utilized to define the phase angle associated with the magnitude of each frequency component as determined by the comparator 29. The phase angle is used to determine the real and imaginary parts of function $e^{j\theta} = \cos\theta + j\sin\theta$; and each frequency component from comparator 29 is multiplied by this function as indicated by multiplier 41. The multiplication performed by multiplier 41 is performed within the Fourier Transform and Power Spectral Density Computer as illustrated in FIG. 3; it is readily apparent that the multiplication could instead be performed by the General Purpose Digital Computer. The output of multiplier 41 is communicated to inverse Fourier transform processor 39 where the frequency domain spectrum defined by these two signals is converted into a time domain digital function. The results of this conversion are stored in shaker input storage 40, a function performed by the computer 20 of FIG. 1. At an appropriate time, this information is fed into D/A converter 34 where it is converted into an analog control signal for shaker system 25.

Numerous techniques and circuits may be utilized to generate the pseudo-random signal. One such circuit adaptable for generating a random digital signal representative of an angle is illustrated in FIG. 4. Techniques for generating a random and pseudo-random signals are discussed in "Random-Process Simulation and Measurements" by Granino A. Korn, Ph.D., a McGraw-Hill Company publication.

The signal generated by the circuit illustrated in FIG. 4 may be utilized as the random phase angle which is one parameter necessary to define the random spectrum by determining the real and imaginary components of $e^{j\theta}$. The digital output from the circuit of FIG. 4 may be used as the binary address for a sine and cosine memory, thus avoiding the computation of the components of $e^{j\theta}$. The generator illustrated in FIG. 4 may be implemented as a separate circuit or may be generated within a general purpose digital computer. A 25 bit shift register 50 receives clock pulses on line 52 which cause the information stored in the register to be shifted to the right. The information contained within cell 3 of the register 50 is communicated to OR gate 58 and inverter 57 via lead 54. The information contained within cell 25 of register 50 is communicated to OR gate 59 and inverter 56 via lead 55. The output of inverter 56 is coupled to OR gate 58 and the output of inverter 57 is coupled to OR gate 59. The outputs from OR gates 58 and 59 are coupled to OR gate 60 and the output from OR gate 60 is communicated to cell 1 of register 50 via lead 61. Register 50, OR gates 58 through 60, and inverters 56 and 57 may be ordinary components commonly known in the digital art.

Each time a clock pulse is received by register 50, the information contained with the register is shifted and a new bit of information is applied to cell 1 via lead 61. With this circuit, a pseudo random digital signal is generated on the lead labeled random phase angle output. It is obvious to one skilled in the art that numerous variations to circuit of FIG. 4 may be readily made and that the circuit would still perform its intended function.

In the presently preferred embodiment of the disclosed system, a random phase angle, having only four possible values, is utilized. These values are arbitrarily chose as $\pm45°$ and $\pm135°$ and the digital signal representative of this angle is sequentially obtained from lead 63. For a more thorough analysis of the mathematics involved in generating the pseudo-random signal utilizing four phase angles, see "A Digital Control Vibration or Acoustics Testing System" by Charles L. Heizman, Proceedings of the Institute of Environmental Sciences, Meeting on Environmental Testing, Ahaheim, Calif. Apr. 20–23, 1969; Pages 387–409.

The circuit illustrated in FIG. 4 generates a signal having a uniform distribution of numbers. The signal is pseudo-random and thus allows predictability and repeatability of the vibration testing performed with the invented system. In addition, the circuit of FIG. 4 has the advantage of being convenient to manufacture and may be implemented within a general purpose digital computer.

While in FIGS 2 and 4, a phase angle generator 31 is utilized to generate the random parameter of the frequency spectrum, it is within the scope of the present invention to utilize other means for generating a random signal. For example, a noise generator may be utilized which produces two independent Gaussian signals of white noise. These signals may be multiplied by the results of the PSD comparison means 29 to produce a set of real and imaginary amplitudes which may be then converted to the time domain by means of the inverse Fourier transform processor 39, illustrated in FIG. 3. Numerous commonly known techniques may be utilized to generate Gaussian signals or white noise. The Gaussian signals would be applied to multiplier 41 of FIG. 3 in lieu of the sine and cosine of the phase angle generated by generator 31. Thus simulating the Gaussian signals which have random Gaussian Fourier coefficients. Another signal which may be multiplied with the results of the PSD comparison means 29 in lieu of the phase angle is a random analog signal upon which a Fourier transform has been performed to yield a set of real and imaginary coefficients. The real and imaginary components of the transformation may be multiplied by the results of the comparison and the products applied to the inverse Fourier transform processor 39.

The disclosed system may be also used for sine wave testing. In such instances, the reference PSD illustrated as reference PSD 30 in FIGS. 2 and 3 would be the spectrum of a sine wave having time varying frequencies. For such testing, a random signal is not required and the results of the comparison means 29 of FIGS. 2 and 3 may be multiplied by a constant before being applied to the frequency-domain-to-time-domain converter 32 of FIG. 2 or the inverse Fourier transform processor 39 of FIG. 3.

Figure 5:
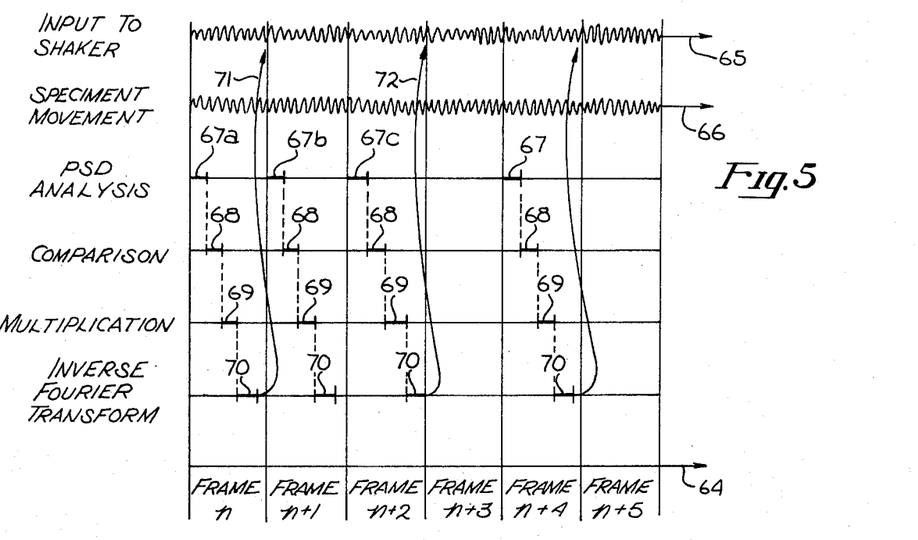
FIG. 5 is a graph illustrating the wave forms flow and timing of various signals associated with the system illustrated in FIG. 1.

Referring to FIG. 5, the timing and signal flow associated with the functions performed by the systems illustrated in FIGS. 1 through 3 are shown on the time axis 64. The axis 64 has been divided into periodic frames of equal duration numbered $n$ through $n+5$. With reference to FIG. 3, the input of driving signal to shaker system 25 is illustrated on axis 65. The movement of the specimen within the shaker system 25 of FIG. 3 is illustrated on axis 66. The signal representative of the movement of a specimen for each frame is stored within means 35 and at the end of each frame, this signal is transmitted to processor 37. In FIG. 5, the time required for the PSD analysis to be performed within processor 37 is illustrated by the horizontal lines 67. Specifically, the signal representative of the shaker movement during frame $n-1$ (not illustrated) is performed during the time indicated by line 67a; likewise, the PSD analysis for the movement of the specimen during frame $n$ is performed during the time indicated by line 67b and the analysis for the movement of a specimen during frame $n+1$ is performed during the time indicated by line 67c. The results from each frame of the PSD analysis is transmitted to comparison means 29 via the average output PSD storage means 36 of FIG. 3. The time required for the comparison between the actual PSD and the reference PSD within means 29 is illustrated as lines 68 in FIG. 5. The time required for the multiplication of the function derived from the phase angle and the results of the comparison is illustrated by horizontal lines 69. Likewise, the time required for the inverse Fourier transform to be performed by processor 39 is illustrated by horizontal lines 70. Thus, for the timing illustrated in FIg. 5, the specimen movement sensed during frame $n-1$ is processed during frame $n$ and is utilized to drive the shaker system during frame $n+1$ as is indicated by line 71. Likewise, the movement of the specimen sensed during frame $n+1$ is processed during frame $n+2$ and is utilized to drive the shaker system during frame $n+3$ as illustrated by line 72. (Note that horizontal lines 67, 68, 69 and 70 for frames $n+3$ and $n+5$ have not been illustrated for the sake of clarity.)

It has been found that in the case of a shaker system without an internal noise source that pseudo-random noise can provide a fast and reliable (errorless) means for adjusting the parameters of the control system provided that the propagation delay for all frequencies throughout the control and shaker system are the same. This can only be true if the phase shift is linear for all frequency. Under these circumstances, any given input frame would be delayed by an equal amount and each frequency component would be delayed identically in time. Knowing that delay, it would be possible to sample the shaker specimen movement so that each frame processed by the PSD processor would correspond to a unique input frame to the shaker system. In this case single spectral estimate from the PSD processor would result in complete correction in the PSD comparator and errorless performance would be maintained.

Unfortunately, even if the shaker system is relatively free of internal self-generated noise, the shaker system generally will not have a linear-phase characteristic and hence, each input frame being a packet of harmonically related frequencies, will be spread by the delay differences at each frequency so that the effective overall duration of a single frame will be increased by the maximum delay of the system. The net result is that any frame (equal or greater in duration) sensed at the output of the shaker system will contain the partial contents of at least two input frames. This effect introduces variance (error) in the measurement of the output spectrum because although two successive frames may have frequency packets that are of equal amplitude at each frequency, the phase relationship has been abruptly altered on a statistical basis between frames. These phase discontinuities introduce uncertainty in the spectral estimates.

If the maximum delay through the shaker system is equal to, or less than, the input frame duration, then a single repetition of an input frame will insure that no phase discontinuities occur in the selected output frame provided that the time corresponding to the beginning of the output frame is taken to be concurrent with the end of the first input frame and therefore concurrent with the repeated input frame.

If the delays through the shaker system are longer than one frame, the input frame can be repeated as many times as necessary so that the duration of the repeated frame equals or exceeds one frame length plus the maximum delay.

Figure 6:
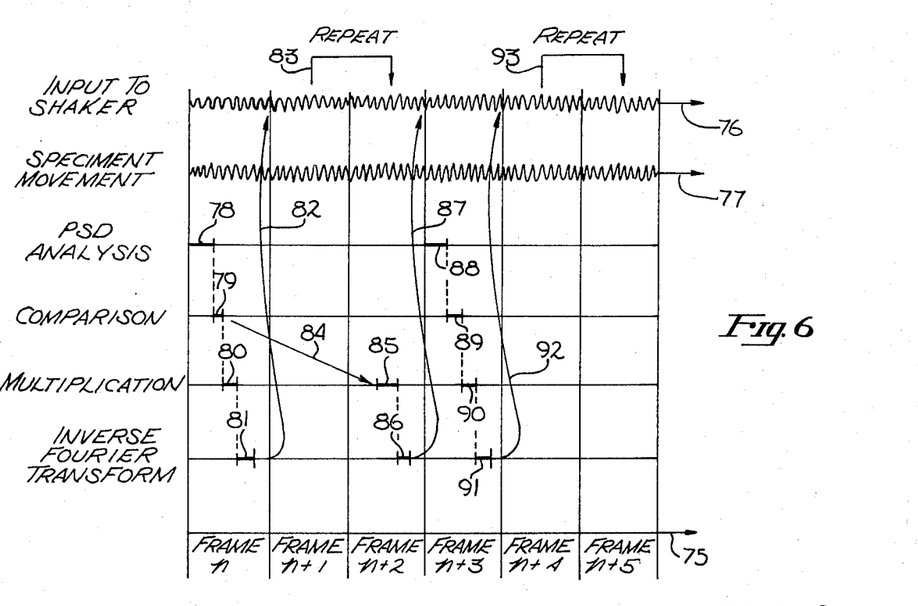
FIG. 6 is a graph illustrating an alternate embodiment for the flow and timing of various signals associated with the system illustrated in FIG. 1; and, FIG. 7 illustrates an alternate embodiment of the present invention wherein the cross sprectrual density is utilized in controlling the movement of a vibration testing apparatus.

Referring to FIG. 6, a method in which the effects of this time delay may be eliminated is illustrated. (It is assumed that the maximum time delay for any driving signal applied to the shaker table is less than the period of the frames.) In FIG. 6, the time axis 75 has been divided into frames numbered n though n+5 as was done in FIG. 5. The input or driving signal to the shaker system is illustrated on axis 76 and the movement of the specimen is illustrated on axis 77.

Assume that the movement of the specimen has been sensed and stored within means 35 of FIG. 3 during frame n−1. The time required for the PSD analysis, the comparison, the multiplication and the inverse Fourier transform are illustrated as horizontal lines 78, 79, 80 and 81, respectively. The results of the inverse Fourier transform are applied to shaker input storage 40 of FIG. 3 and are used to drive the shaker system 25 during frame n+1 as indicated by line 82. The signal used to drive the system 25 for frame n+2 is repeated in identical form for frame n+2 as indicated by line 83. This may be readily accomplished within shaker input storage means 40 by commonly known memory techniques. During frame n+2, the results of the comparison made during frame n are placed within input spectrum storage 38 and are called upon during frame n+2 as indicated by line 84 and the multiplication step within multiplier 41 of FIG. 3 is repeated as indicated by line 85. The result of this multiplication is applied to processor 39, the processing time being indicated by line 86 of FIG. 6. The results of this processing are used to drive the shaker system during frame n+3 as indicated by line 87. During frame n+2, the movement of the specimen is sampled and stored within shaker output storage 35 (FIG. 3) and the processing time through the system for this information is indicated by the horizontal lines 88, 89, 90 and 91. The results of the inverse Fourier transform which occurs during frame n+3 are utilized to drive the shaker system during frame n+4 as indicated by lines 92. Once again the signal used to drive the shaker system during frame n+4 is repeated in identical form during frame n+5 as indicated by line 93. Thus, as illustrated in FIG. 6, the results of any comparison may be multiplied by a random signal and used to produce a time domain signal for driving the shaker system at a later time. Also, the signal used to drive the shaker system for any frame may be repeated for subsequent frames. It has been found that by utilizing the timing and processing of the signals illustrated by FIG. 6, the undesirable effects caused by the time delays of shaker system 25 are eliminated.

In the previously discussed embodiments of the present invention a signal which represented the movement of the specimen on the shaker system was utilized in conjunction with a reference spectrum and a randomly generated signal to produce a driving or excitation signal. The signal representative of the movement of the specimen often contains noise which is generated by the specimen itself or caused by non-linearities in the shaker system. Thus, in these previously discussed embodiments this noise is a factor in determining the driving or excitation signal. It is desirable in some application to subject a specimen to a predetermined spectrum independently of the noise generated either by the specimen itself or by non-linear and imperfections in the shaker system. Testing performed in this manner more accurately represents the vibration environments encountered by the specimen in actual use since the noise produced by the specimen may not affect the vibrations to which the specimen is subjected.

Figure 7:
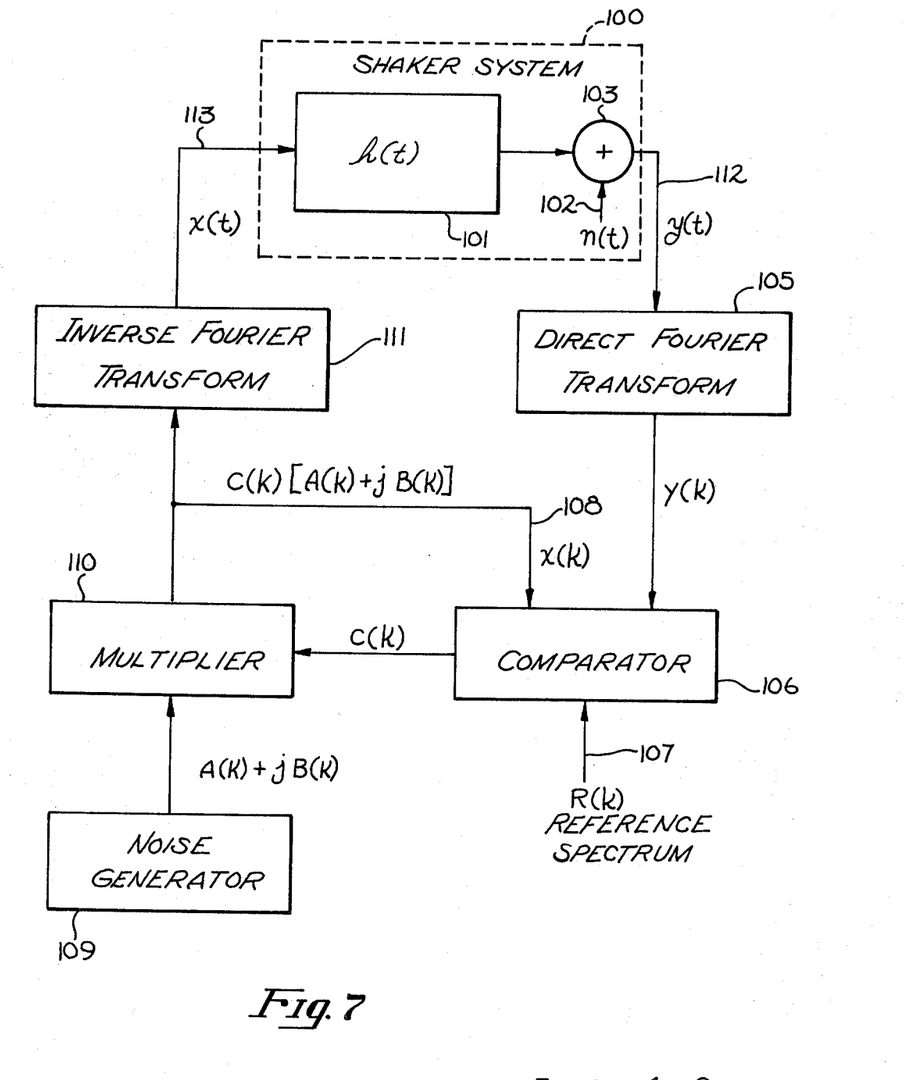

The excitation or driving signal which is utilized in the embodiment illustrated in FIG. 7 to drive the shaker system is generated after the effects of the noise associated with the shaker system and specimen have been eliminated. In the previously discussed embodiments the auto-spectral or power spectral density (PSD) was utilized in the generation of the driving signal. The calculation for the PSD does not utilize the phase information which may be generated in determining the Fourier coefficients of a particular time domain function. In the embodiment illustrated in FIG. 7 the phase relationship of the Fourier coefficients of the frequency domain representation of the input and output signals of the shaker system are utilized along with the magnitudes of the coefficients to determine the cross-spectral density of these signals. The cross-spectral density along with the PSD are utilized to estimate the transfer function of the shaker system independent of the noise associated with that system or the specimen. This transfer function along with a randomly generated signal are used to produce a driving signal for the shaker system.

Referring to FIG. 7 a shaker system 100 is illustrated with an input signal, (the excitation or driving signal) $x(t)$, coupled to the shaker system 100 on lead 113 and an output signal (lead 112). The output signal $y(t)$ represents the movement of the specimen on the shaker system 100. The vibration apparatus or shaker system 100 is assumed to have a linear impulse response and transfer function which represents the response of the system to an input signal $x(t)$. This linear impulse response is illustrated in block 101 as $h(t)$. Note that $h(t)$ is the impulse response of the shaker apparatus with the specimen. The noise caused by the specimen and non-linearities of the shaker system is assumed to be Gaussian and is illustrated as $n(t)$, said noise being added to the output of block 101 at point 103. Thus, the output $y(t)$ is a function of the input $x(t)$ as affected by the shaker system transfer function $h(t)$ and the noise $n(t)$.

The following mathematical explanation illustrates the method in which an excitation or driving signal is developed independently of the noise $n(t)$. In equation (7) below, the signal $y(t)$ contains two terms; the first being the input or driving signal $x(t)$ convolved with the impulse response $h(t)$ of the system, and the second being the noise $n(t)$.

$$y(t) = h(t) * x(t) + n(t) \tag{7}$$

This equation is rewritten in a frequency domain form as equation (8) wherein $k$ represents the fourier coefficients of the time domain terms.

$$Y(k) = H(k) X(k) + N(k) \tag{8}$$

Each of the terms of equation (8) may be represented by their real and imaginary part as shown in equations (9) through (12) below, where $P$ represents the real components and $Q$ the imaginary components.

$$Y(k) = P_y + j Q_y \tag{9}$$

$$H(k) = P_H + j Q_H \tag{10}$$

$$X(k) = P_X + jQ_X \quad (11)$$

$$n(k) = P_N + JQ_N \quad (12)$$

Thus, $Y(k)$ may be written as $$P_Y + jQ_Y = (P_H + jQ_H)(P_X + jQ_X) + P_N + jQ_N$$

Equating the real and imaginary part of equation (13) produces:

$$P_Y = P_H P_X - Q_H Q_X + P_N \quad (14)$$

$$Q_Y = Q_H P_X + P_H Q_X + Q_N \quad (15)$$

It was initially assumed that the noise $n(t)$ was Gaussian, therefore $P_N$ and $Q_N$ are Gaussian and independent. Maximum likelihood criteria leads to the minimization of these quantities with respect to $P_H$ and $Q_H$ as follows:

$$\sum_{l=0}^{L-1}(P_{N_l})^2 = \sum_{l=0}^{L-1}(P_{Y_l} - P_H P_{X_l} + Q_H Q_{X_l})^2 \quad (16)$$

$$\sum_{l=0}^{L-1}(Q_{N_l})^2 = \sum_{l=0}^{L-1}(Q_{Y_l} - Q_H P_{X_l} - P_H Q_{X_l})^2 \quad (17)$$

From equations (16) and (17) it can be shown algebraically that the quantities $P_H$ and $Q_H$ may be estimated by the following equations, where $\hat{P}_H$ and $\hat{Q}_H$ are estimators for $P_H$ and $Q_H$.

$$\hat{P}_H = \frac{\Sigma P_{X_l} P_{Y_l} + \Sigma Q_{X_l} Q_{Y_l}}{\Sigma |P_X + jQ_X|^2} \quad (18)$$

$$\hat{Q}_H = \frac{\Sigma Q_{X_l} P_{Y_l} - \Sigma P_{X_l} Q_{Y_l}}{\Sigma |P_X + jQ_X|^2} \quad (19)$$

Since $H(k)$ is equal to $P_H + jQ_H$; $H(k)$ may be written as:

$$\hat{H}(k) = \frac{\Sigma(P_{Y_l} - jQ_{Y_l})(P_{X_l} + jQ_{X_l})}{\Sigma |P_X + jQ_X|^2} \quad (20)$$

If $Y^*(k)$ is made equal to the complex conjugate of $Y(k)$ then $H(k)$ may be written as:

$$\hat{H}(k) = \frac{\Sigma X_l(k) \cdot Y^*_l(k)}{\Sigma |X_l(k)|^2} \quad (21)$$

Thus, from equation (21) it can be seen that the transfer function $H(k)$ of the shaker system may be estimated from the input and output signals $X(t)$ and $Y(t)$. Note that the numerator shown in equation (21) is the cross-spectral density of $x(t)$ and $y(t)$ and that in order to compute the numerator the phase information associated with Fourier coefficients of $x(t)$ and $y(t)$ is required. The denominator shown in equation (21) is the PSD utilized in the previous embodiments of the present invention.

Assume that $R(k)$ is the desired or predetermined power spectrum to which the specimen is to be subjected and that $C(k)$ represents the results of the comparison between the desired spectrum and the spectrum to which the specimen is subjected. Then the following equation may be written:

$$[R(k)]^{1/2} = C(k) |\hat{H}(k)| \quad (22)$$

Note that the square root of the $R(k)$ is utilized since this spectrum is generally given in terms of a power spectral density. Thus, the magnitude of the input Fourier coefficients which will be utilized in determining the driving signal for the shaker system becomes:

$$C(k) = |R(k)|^{1/2} / |\hat{H}(k)| \quad (23)$$

noting that $H(k)$ and $C(k)$ are complex functions but only their magnitudes are used to determine $C(k)$. The system illustrated in FIG. 7 may also be utilized where other methods are used to determine $|H(k)|$, where $|H(k)|$ is the transfer function of the shaker system which includes the specimen. Thus, from the above mathematical analysis, it is apparent that the noise $n(t)$ has been eliminated from the determination of the driving signal.

A system which produces the results above described is illustrated in FIG. 7. The signal $y(t)$ is coupled to means for generating the direct Fourier transform 105 by lead 112. Means 105 may be a digital computer or a specialized computer as discussed elsewhere in this patent for obtaining the Fourier transform of a signal. The output of the direct Fourier transform means 105 is $Y(k)$; note that the output from means 105 must contain both the magnitude of the Fourier coefficients and the phase angles associated with these coefficients. This information is coupled to comparator 106. The reference spectrum $R(k)$ is also coupled to the comparator on lead 107.

Noise generator 109 may be any means for generating a random signal such as the means illustrated in FIG. 4. The output of generator 109 contains a "real" random signal $A(k)$ and an "imaginary" signal $B(k)$; these signals are coupled to multiplier 110. These signals may be produced from a single circuit such as the one illustrated in FIG. 4, by time sharing the output of that circuit or by two circuits as illustrated in FIG. 4.

The output signal of the comparator has been illustrated in FIG. 7 as $C(k)$, this designation corresponding to the designation utilized in the above equations. This signal is coupled to multiplier 110 and is multiplied by the output of a noise generator 109. Multiplier 110 may be any one of numerous commonly known means for multiplying two signals. The output product from multiplier 110 that is the product of $C(k)$ and $(A(k) + jB(k))$ is coupled to the inverse Fourier transform means 111 and to the comparator 106 by lead 108. Note that this product is $X(k)$ described in the above equations.

Inverse Fourier transform means 111 is utilized to transform the signal $S(k)$ from the frequency domain to the time domain. A digital computer or a specialized computer may be utilized to perform this function. In practice means 105 and 111 may be a common means. The output of inverse Fourier transform means 111, $x(t)$, is the time domain excitation or driving signals for the shaker system 100 and is coupled to the shaker system on lead 113. This signal corresponds to the output from the D/A converter 34 illustrated in FIG. 3. In FIG. 7. the analog to digital and digital to analog converters illustrated in FIG. 3 have been omitted in order to simplify the diagram of FIG. 7. It will be obvious to one skilled in the art that if the computations performed by the various means in FIG. 7 are to be performed in digital form appropriate analog to digital and digital to analog converters may be required.

The inputs to comparators 106 are $R(k)$ the reference spectrum, $Y(k)$ the Fourier coefficients representative of the movement of a specimen on the shaker table and $X(k)$ the Fourier coefficients of the driving signal for the shaker system. Both the magnitude and phase information for the coefficients represented by $X(k)$ and $Y(k)$ are provided to comparator 106. Comparator 106 solves equation (23). In order to do this the PSD and cross-spectral density must be computed in order to determine $\hat{H}(k)$ as illustrated in equation (21). The quantity $\hat{H}(k)$ is then divided into the square root of the predetermined or desired spectrum $R(k)$ in order to compute $C(k)$. Comparator 106 thus may be an ordinary digital computer adaptable for performing this computation. As previously discussed the means for performing the direct and inverse Fourier transform and the comparator means may be a single digital computer.

The timing techniques previously discussed in conjunction with FIGS. 5 and 6, and the structure discussed in conjunction with FIGS 1 through 4 are applicable to the system illustrated in FIG. 7. The extent of this applicability will be obvious to one skilled in the art.

Thus, through use of the cross-spectral density of $x(t)$ and $y(t)$ a driving signal is developed independently of the noise associated with the shaker system and specimen.

In the presently preferred embodiments of the present invention the computation of the direct and inverse Fourier transform and the PSD and cross-spectral density are performed by commercially available "hard-wired" digital computers. For example, referring to FIG. 2, processor 27 and converter 32 or transform means 105 and 111 of FIG. 7, may comprise a single commercially available unit. The presently preferred computer for this function is Model TD–90 or TD–100 manufactured by the Time/Data Corporation, Palo Alto, California. These computers are also equipped to perform the analog-to-digital and digital-to-analog conversions illustrated by converters 15 and 22 of FIG. 1, and converters 26 and 34 of FIGS. 2 and 3. Additionally, these computers periodically sample an input analog signal (such as the output from amplifier 14 of FIG. 1, shaker system 25 of FIGS. 2 and 3 or shaker system 100 of FIG. 7) and perform a Fourier transform on each frame of sample data. This readily allows the implementation of the signal timing schemes illustrated in FIGS. 5 and 6 since the output of these computers corresponds to the frames $n$, $n+1$, etc. The computation of the Fourier transform may alternatively be performed using the known Cooley-Tukey algorithm. An implementation of this algorithm is illustrated in U.S. Pat. No. 3,517,173. Also, for another algorithm which may be implemented for the Fourier transform which is particularly adaptable for real inputs, such as the outputs from the vibration apparatus, see U.S. Pat. No. 3,638,004.

The function of the comparators 29 of FIGS. 2 and 3 and 106 of FIG. 7, may likewise be performed by commercially available computers. This function, as previously discussed, involves well known arithmetic computations such as division and multiplication. In the presently preferred embodiment a Model PDP-11 computer manufactured by Digital Equipment Corp. is utilized. Other computers which may be used for this function are the "Super-Nova," manufactured by Data General Corp. or the Model 620/S computer manufactured by Varian Corp. The interconnections between the above-mentioned computers and the other elements required to implement the entire system, such as the multiplier 19 and generator 31 for the embodiment of FIG. 2, or the multiplier 110 and generator 109 for the embodiment of FIG. 7, will be obvious to one of ordinary skill in the art.

Thus, a system for driving a vibration testing apparatus with a random signal designed to subject a specimen on the apparatus to a predetermined spectral density has been disclosed. Computations required to control the system are done in digital form, to take advantage of the high speed digital computer art.

We claim:

1. A system for controlling a vibration environment comprising:
   sensing means for sensing the movement of a specimen in said environment and for producing a digital signal representative of said movement;
   first computer means for converting said digital signal into a spectrum signal representative of a frequency domain spectrum of said digital signal, coupled to said sensing means;
   comparator means for comparing said spectrum signal with a predetermined spectrum signal and for producing a comparison signal representative of said comparison, coupled to said first computer means;
   a random generator, for generating a random signal;
   multiplication means for multiplying said random signal with said comparison signal and for producing a random spectrum signal representative of said multiplication, coupled to said generator and said comparator means;
   second computer means for converting said random spectrum signal into a time domain signal and for producing a signal representative thereof coupled to said multiplication means;
   driving means for converting said time domain signal into an analog driving signal and for producing vibration in said environment representative of said analog signal;
   whereby a specimen in said environment will be subjected to vibrations having the frequency content of said predetermined spectrum.

2. The system defined by claim 1 wherein said first computer means and comparator means compute the cross-spectral density of said signal representative of said movement and said random spectrum signal and compare that result with the power spectral density of said random spectrum signal and said predetermined spectrum signal.

3. A system for controlling a vibration producing apparatus in accordance with a predetermined frequency domain representation of vibrations comprising:
   sensing means for sensing the movement of said vibration producing apparatus and for producing a digital signal representative of said movement, coupled to said apparatus;
   a first computer means for converting said digital signal into a first frequency domain representation of said digital signal, coupled to sensing means;

comparator means for comparing said predetermined frequency domain representation with said first frequency domain representation and for producing a second frequency domain digital output signal representative of said comparison, coupled to said first computer means;

generator means for generating a random signal;

combining means for combining said random signal with said digital output signal and for producing a random spectrum signal representative of said comparison and said random signal coupled to said generator and said comparator means;

a second computer means for converting said random spectrum signal into a random time domain signal, coupled to said combining means; and, conversion means for converting said random time domain signal into an analog signal and adaptable for controlling said vibration producing apparatus coupled to said second computer means and said apparatus;

whereby said vibration producing apparatus is controlled by said predetermined frequency domain representation.

4. The system defined in claim 3 wherein said predetermined and first frequency domain representations are power spectral density representations.

5. The system defined in claim 4 wherein said first and second computer means are a single means adaptable for computing the Fourier and inverse Fourier transformation of a signal.

6. The system defined in claim 5 wherein said comparator means is a general purpose digital computer.

7. The system defined in claim 4 wherein said sensing means comprises means for sensing the movement of said vibration apparatus and for producing an analog signal representation of said movement and an analog to digital converter for converting the analog signal into digital form.

8. A method for controlling the movement of a vibration producing apparatus to produce vibrations having predetermined frequency contents comprising the following steps:

sensing the movement of said apparatus and producing a digital signal representative of the sensed movement;

converting the digital signal to a frequency domain representation;

comparing the converted digital signal to the predetermined frequency contents and producing an output signal representative of said comparison;

generating a random signal;

combining said random signal with said output signal representative of said comparison;

converting said combined signal into an analog time domain driving signal; and, driving the vibration producing apparatus with said analog driving signal.

9. The method defined in claim 8 wherein the frequency domain representation comprises a power spectral density representation.

10. The method defined in claim 9 wherein said random signal comprises the sine and cosine of a random digital signal representative of an angle and said combining means comprises means for multiplying said sine and cosine of said angle by said output signal representative of said comparison.

11. The method defined in claim 9 wherein the power spectral density is computed for frames of equal duration and where the power spectral density for a plurality of frames is averaged before being compared with the predetermined power spectral density.

12. The method defined in claim 8 wherein the driving analog signal comprises a series of frames of equal duration and where said frames of driving signal are stored and repeated.

13. The method defined in claim 12 wherein the sensing of movement of said apparatus is performed during frames of equal duration and where the combining, converting into a time domain driving signal and driving steps are repeated for frames of sensed movement.

14. The method defined in claim 13 wherein the frames of sensed movement and the frames of the driving analog signal are concurrent and where every fourth frame of the driving signal is followed by a repeated frame and where each repeated frame is followed by a frame determined by repeating the combining, converting into a time domain driving signal and driving steps.

15. The method defined in claim 8 wherein the movement of said apparatus is sensed in frames of equal duration and where the conversion, comparing and driving steps are performed consecutively for each such sensed frame.

16. The method defined in claim 15 wherein the results of a plurality of frames of said conversion of said digital signal to a frequency domain representation are averaged before said comparison step.

17. A system for driving a vibration apparatus with a random signal such that a specimen on or in the apparatus is subjected to vibrations having a predetermined power spectral density comprising:

sensing means coupled to said specimen for sensing the movement of said specimen and for producing an output signal representative of said movement;

an analog to digital converter for converting the output signal of said sensing means into a digital signal, coupled to said sensing means;

a first computer means for computing the power spectral density of said digital signal and for producing an output digital signal representative of said spectral density, coupled to said analog to digital converter;

comparator means for comparing said signal representative of said spectral density with said predetermined power spectral density and for producing an output digital signal representative of said comparison coupled to said first computer means;

a random digital generator means for generating a random digital frequency spectrum, said generator utilizing said output signal from said comparator means for defining at least one parameter of said random frequency spectrum, coupled to said comparator means;

a second computer means for converting said frequency spectrum into a digital time domain representation coupled to said generator;

a digital to analog converter for converting the digital output of said second computer means into an analog driving signal, coupled to said second computer and said apparatus; and, control means for controlling the interaction of the components in the system;

whereby the analog driving signal of said digital to analog converter drives the apparatus with a random signal and causes a specimen on or in the apparatus to be subjected to vibrations having a power spectral density approximately equal to the predetermined power spectral density.

18. The system defined in claim 17 wherein said first and second computer means include a first digital computer adaptable for computing Fourier and inverse Fourier transforms.

19. The system defined in claim 18 wherein a second digital computer is utilized as said comparator means and said control means.

20. The system defined in claim 19 wherein said second digital computer is a general purpose digital computer.

21. The system defined in claim 17 wherein said first and second computers, said comparator and said control means comprises a single general purpose digital computer.

22. The system defined in claim 17 wherein said random digital generator means includes:
means for generating a random digital signal representation of a phase angle;
means for determining the sine and cosine of said phase angle; and,
means for multiplying said sine and cosine of said phase angle with said output signal said comparator means.

23. The system defined in claim 22 wherein said random signal comprises four predetermined angles.

24. A method for controlling the movement of a vibration producing apparatus with a random signal to produce vibrations having a predetermined power spectral density comprising:
comparing the power spectral density representation of the movement of the apparatus with the predetermined power spectral density and generating a digital signal representative of said comparison;
generating a random signal;
converting the results of said comparison and said random signal into a time domain random driving signal by utilizing an inverse Fourier transform; and,
controlling the movement of the apparatus with said random driving signal.

25. The method defined in claim 24 wherein the comparison comprises comparing the amplitudes of the power spectral density representative of the movement of the apparatus at a plurality of frequencies with the amplitudes at the same frequency of the predetermined power spectral density.

26. A generator for controlling the operations of a system comprising:
means for generating a random signal;
means for determining the Fourier coefficients of a parameter in said system and for producing a signal representative of said coefficients;
means for multiplying said random signal by said signal representative of said coefficients and for producing an output signal, coupled to said other means;
whereby said output signal may be used to control the operation or analysis of a system.

27. A system for driving a vibration apparatus with a random signal such that a specimen on or in the apparatus is subjected to vibration having a predetermined frequency spectrum comprising:
means for determining the transfer function of said vibration apparatus and specimen and for providing a signal representative of said transfer function;
comparator means for comparing said signal representative of said transfer function with said predetermined frequency spectrum and for providing an output signal representative of said comparison;
a generator means for generating a random signal;
multiplication means for multiplying two signals and for producing a product signal representative of the product of said two signals coupled to said generator means and said comparator means;
transfer means for converting a signal representative of a frequency domain function to a signal representative of a time domain function, coupled to said multiplication means; said signal representative of said time domain function being coupled to said vibration apparatus and used to drive said apparatus.

28. The system defined by claim 27 including:
means for sensing the movement of said specimen on said vibration apparatus and for providing an output signal representative of said movement, and a Fourier transform means for determining the Fourier coefficients of said signal representative of said movement and for providing a signal representative of said Fourier coefficients and where said signals representative of said fourier coefficients are used by said means for determining said transfer function for determining said transfer function.

29. A system for controlling a vibration environment to a predetermined spectrum comprising:
sensing means for sensing the movement of a specimen in said environment and for producing a signal representative of said movement;
direct Fourier transform means for performing a direct Fourier transform on a time domain signal coupled to said sensing means;
a noise generator;
a multiplication means for multiplying two signals and for producing an output signal, representative of the product of the said two signals coupled to said noise generator;
an inverse Fourier transform means for converting a signal representative of a frequency domain function to a time domain function coupled to said output signal from said multiplication means;
a comparator means for computing the cross spectral density and for comparing said cross spectral density with said predetermined spectrum and for producing an output signal representative of said comparison, said output signal being coupled to said multiplier and said comparator means being coupled to said direct Fourier transform means and the output signal from said multiplication means, whereby the output from said inverse Fourier transform is a time domain signal for controlling said vibration environment.

30. The system defined by claim 29 wherein said comparator means also utilizes the power spectral density in said comparison.

* * * * *